(12) United States Patent
Huang et al.

(10) Patent No.: US 11,848,897 B2
(45) Date of Patent: Dec. 19, 2023

(54) METHODS AND APPARATUS FOR SUBBAND FULL-DUPLEX

(71) Applicant: QUALCOMM Incorporated, San Diego, CA (US)

(72) Inventors: Yi Huang, San Diego, CA (US); Wei Yang, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 17/214,512

(22) Filed: Mar. 26, 2021

(65) Prior Publication Data

US 2021/0320779 A1    Oct. 14, 2021

Related U.S. Application Data

(60) Provisional application No. 63/008,249, filed on Apr. 10, 2020.

(51) Int. Cl.
*H04L 5/14* (2006.01)
*H04W 72/0446* (2023.01)

(52) U.S. Cl.
CPC ........... *H04L 5/14* (2013.01); *H04W 72/0446* (2013.01)

(58) Field of Classification Search
CPC .... H04L 5/14; H04L 5/0092; H04W 72/0446; H04W 72/0453; H04W 72/042
See application file for complete search history.

(56) References Cited

U.S. PATENT DOCUMENTS

2018/0020457 A1*   1/2018  Noh ...................... H04L 5/0094

* cited by examiner

*Primary Examiner* — Dady Chery
(74) *Attorney, Agent, or Firm* — QUALCOMM Incorporated

(57) ABSTRACT

Aspects of the present disclosure include methods, apparatuses, and computer readable media for configuring at least one subband comprising subband full-duplex (SB-FD) resource for an uplink transmission associated with a user equipment (UE), wherein the SB-FD resource overlap at least partially with a downlink data in a time domain and transmitting a configuration message for the subband full-duplex resource for the uplink transmission.

30 Claims, 14 Drawing Sheets

1300

1305
CONFIGURING AT LEAST ONE SUBBAND COMPRISING SUBBAND FULL-DUPLEX (SB-FD) RESOURCE FOR UPLINK TRANSMISSION ASSOCIATED WITH A USER EQUIPMENT (UE), WHEREIN THE SB-FD RESOURCE OVERLAP AT LEAST PARTIALLY WITH DOWNLINK TRANSMISSIONS IN A TIME DOMAIN

1310
TRANSMITTING A CONFIGURATION MESSAGE FOR THE SUBBAND FULL-DUPLEX RESOURCE FOR THE UPLINK TRANSMISSION

1300

1305

CONFIGURING AT LEAST ONE SUBBAND COMPRISING SUBBAND FULL-DUPLEX (SB-FD) RESOURCE FOR UPLINK TRANSMISSION ASSOCIATED WITH A USER EQUIPMENT (UE), WHEREIN THE SB-FD RESOURCE OVERLAP AT LEAST PARTIALLY WITH DOWNLINK TRANSMISSIONS IN A TIME DOMAIN

1310

TRANSMITTING A CONFIGURATION MESSAGE FOR THE SUBBAND FULL-DUPLEX RESOURCE FOR THE UPLINK TRANSMISSION

RECEIVING A CONFIGURATION MESSAGE ASSOCIATED WITH AT LEAST ONE SUBBAND COMPRISING SUBBAND FULL-DUPLEX (SB-FD) RESOURCE FOR UPLINK TRANSMISSION ASSOCIATED WITH A USER EQUIPMENT (UE), WHEREIN THE SB-FD RESOURCE OVERLAP AT LEAST PARTIALLY WITH DOWNLINK TRANSMISSION IN A TIME DOMAIN

1410

TRANSMITTING UPLINK DATA VIA THE SB-FD RESOURCE

*FIG. 14*

METHODS AND APPARATUS FOR SUBBAND FULL-DUPLEX

CROSS-REFERENCE TO RELATED APPLICATIONS

The current application claims priority to and the benefit of U.S. Provisional Application No. 63/008,249 filed on Apr. 10, 2020, entitled "Methods and Apparatus for Subband Full-Duplex," the contents of which are incorporated by reference in their entireties.

BACKGROUND

Aspects of the present disclosure relate generally to wireless communications, and more particularly, to apparatuses and methods for frequency division duplex (FDD) in unpaired spectrum.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for configuring at least one subband comprising a subband full-duplex (SB-FD) resource for an uplink transmission associated with a user equipment (UE), wherein the SB-FD resource overlap at least partially with a downlink transmission in a time domain and transmitting a configuration message for the subband full-duplex resource for the uplink transmission.

Other aspects of the present disclosure include a UE having a memory comprising instructions, a transceiver, and one or more processors operatively coupled with the memory and the transceiver, the one or more processors configured to execute instructions in the memory to configure at least one subband comprising a subband full-duplex (SB-FD) resource for an uplink transmission associated with a user equipment (UE), wherein the SB-FD resource overlap at least partially with a downlink transmission in a time domain and transmit a configuration message for the subband full-duplex resource for the uplink transmission.

An aspect of the present disclosure includes a UE including means for configuring at least one subband comprising a subband full-duplex (SB-FD) resource for an uplink transmission associated with a user equipment (UE), wherein the SB-FD resource overlap at least partially with a downlink transmission in a time domain and means for transmitting a configuration message for the subband full-duplex resource for the uplink transmission.

Some aspects of the present disclosure include non-transitory computer readable media having instructions stored therein that, when executed by one or more processors of a UE, cause the one or more processors to configure at least one subband comprising a subband full-duplex (SB-FD) resource for an uplink transmission associated with a user equipment (UE), wherein the SB-FD resource overlap at least partially with a downlink transmission in a time domain and transmit a configuration message for the subband full-duplex resource for the uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 13 is a process flow diagram of an example of a method for allocating resources in a SB-FD slot; and FIG. 14 is a process flow diagram of an example of a method for transmitting uplink information in a SB-FD slot.

DETAILED DESCRIPTION

Figure 1:
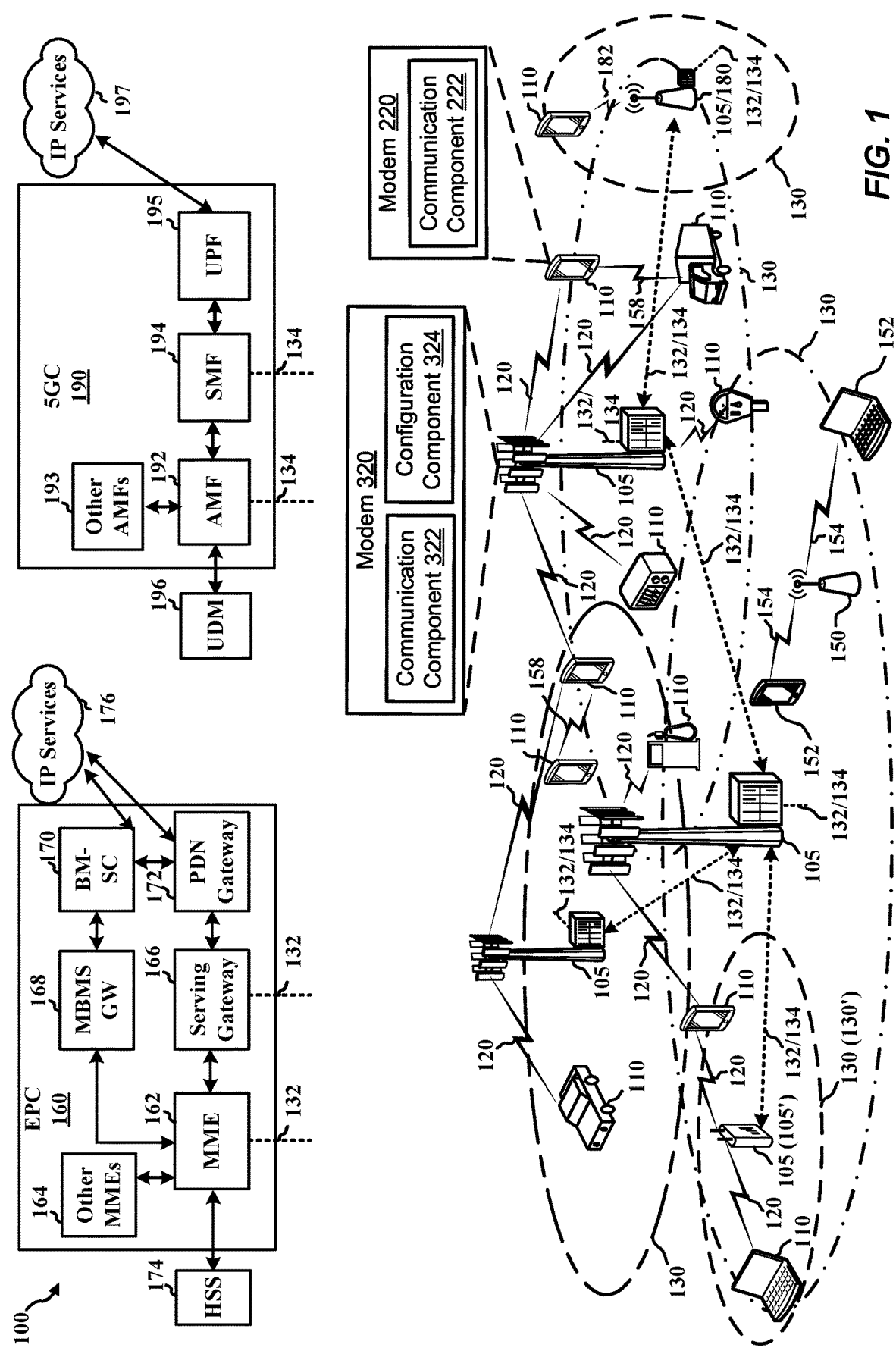
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In a wireless communication network, a base station (BS) and a user equipment (UE) may exchange information in one or more uplink and/or downlink slots in a communication channel. In a conventional scheme, the BS may allocate a first slot for downlink transmissions, a second slot for downlink transmissions, a third slot for special transmissions, and a fourth slot for uplink transmissions. However, if a UE intends to transmit uplink information (e.g., acknowledgement) in response to downlink transmissions in the first slot, the UE has to wait until the third slot or the fourth slot. This delay may create latency. Therefore, improvements may be desirable.

In some instances, macro networks may use certain patterns for downlink (DL) and uplink (UL) transmission. In a conventional scheme, the BS may allocate a first slot for downlink transmissions, a second slot for downlink transmissions, a third slot for special transmissions, and a fourth slot for uplink transmissions. For example, a network may use a DL-DL-special-UL transmission pattern in unpaired spectrum. Operators in adjacent channels may use the same time-division duplex (TDD) pattern. In some instances, UL transmissions may be power limited as the UE may not need the entire bandwidth (BW). It may be desirable to implement dynamic scheduling in baseline operations. Examples of UL transmission include physical uplink control channel (PUCCH) and physical uplink shared channel (PUSCH). Examples of DL transmission include physical downlink control channel (PDCCH), physical downlink shared channel, and physical broadcast channel (PBCH).

In some aspects of the present disclosure, the BS may partition component carriers (CC) into UL BW and DL BW to improve cell edge coverage with minimal loss in throughput relative to baseline TDD macro. Specifically, the UE may send UL information (data or control) to the BS in the same slot as DL transmissions instead of waiting for the next available UL transmission slot. Frequency-division duplex (FDD) may be applied across CCs or within CCs in the case of carrier aggregation in unpaired spectrum. Benefits of such allocation may include latency reduction that enables always-on UL, power boosting for UL link budget allowing higher UL throughput, and/or dynamic TDD slot structure.

In certain aspects of the present disclosure, after the radio resource control (RRC) configures the SB-FD bandwidth configuration, but before the RRC configures the dedicated PUCCH resource sets for the SB-FD slots, the UE may select the PUCCH resource perform PUCCH feedback as described below.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222. The communication component 222 and/or a modem 220 of the UE 110 may be configured to communicate with the BS 105 via a cellular network, a Wi-Fi network, or other wireless and wired networks. In some implementations, the BS 105 may include a communication component 322 and/or a modem 320 configured to communicate with the UE 110. The BS 105 may include a configuration component 324 that configures resources allocated to the UE 110.

A BS 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
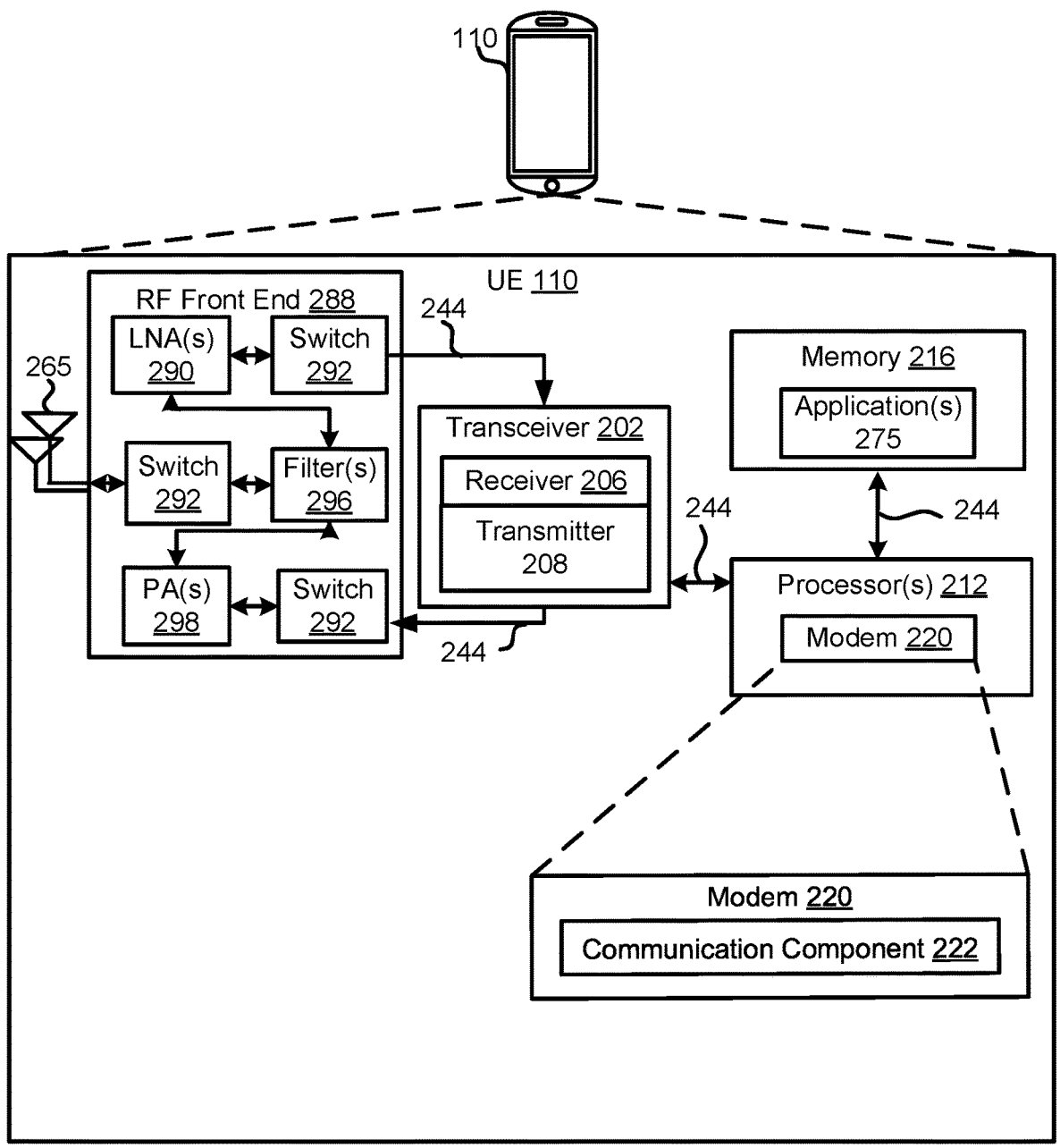
FIG. 2 is a schematic diagram of an example of a user equipment.

Referring to FIG. 2, one example of an implementation of the UE 110 may include a modem 220 having a communication component 222. The communication component 222 and/or the modem 220 of the UE 110 may be configured to communicate with the BS 105 via a cellular network, a Wi-Fi network, or other wireless and wired networks.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

Also, memory 216 may be configured to store data used herein and/or local versions of applications 275 or the communication component 222 and/or one or more subcomponents of the communication component 222 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or one or more of its subcomponents, and/or data associated therewith, when UE 110 is operating at least one processor 212 to execute the communication component 222 and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
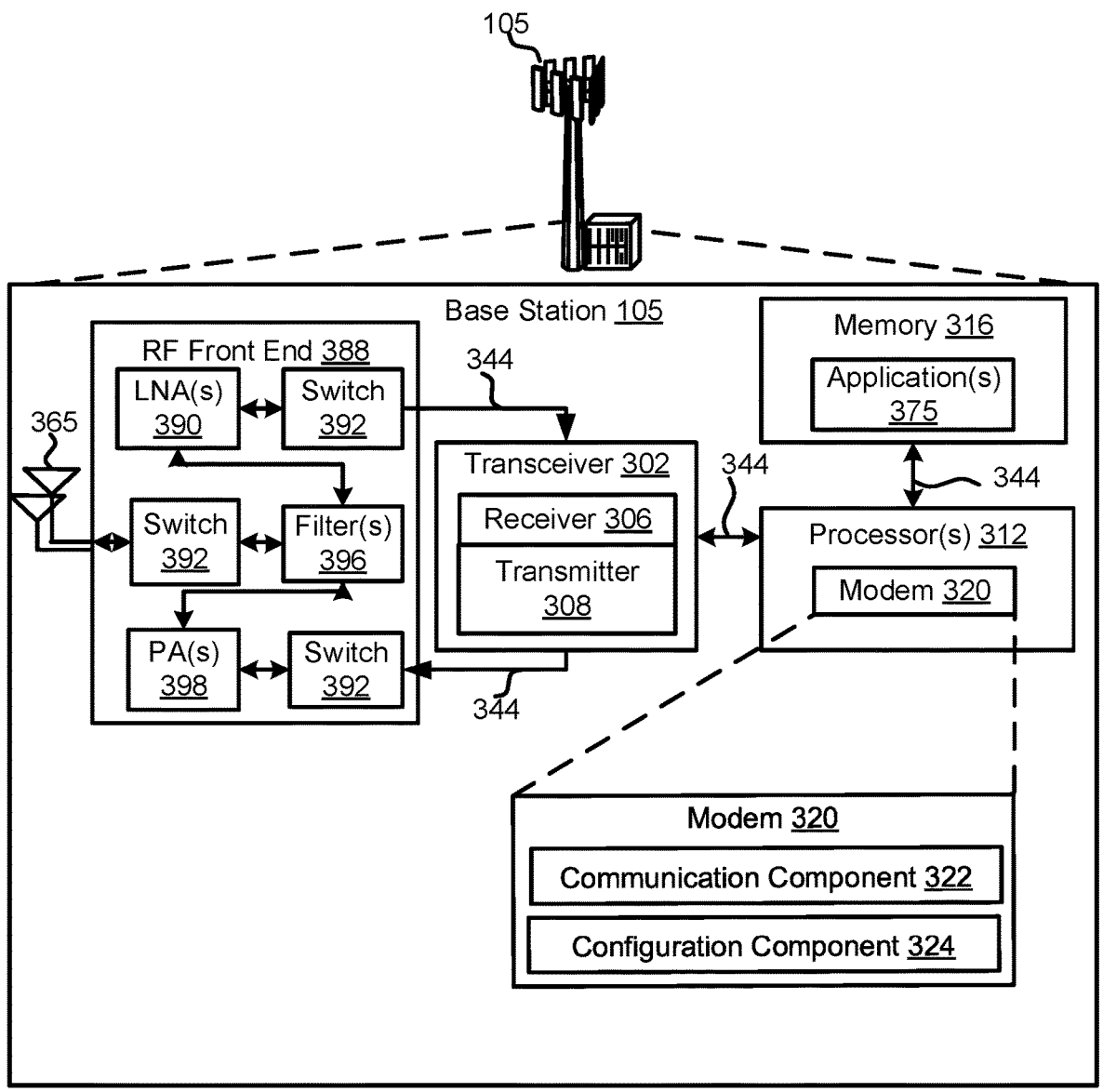
FIG. 3 is a schematic diagram of an example of a base station.

Referring to FIG. 3, one example of an implementation of the BS 105 may include a modem 320 with a communication component 322 configured to transmit data. The communication component 322 and/or the modem 320 the BS 105 may be configured to communicate with the UE 110 via a cellular network, a Wi-Fi network, or other wireless and wired networks. The BS 105 may include a configuration component 324 that configures resources allocated to the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 320 that uses one or more modem processors. The various functions related to the communication component 322 and/or the configuration component 324 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 322, the configuration component 324, and/or one or more subcomponents of the communication component 322 or the configuration component 324 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, the configuration component 324, and/or one or more of the subcomponents, and/or data associated therewith, when the BS 105 is operating at least one processor 312 to execute the communication component 322, the configuration component 324, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). Receiving device 306 may be, for example, a RF receiving device. In an aspect, receiving device 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
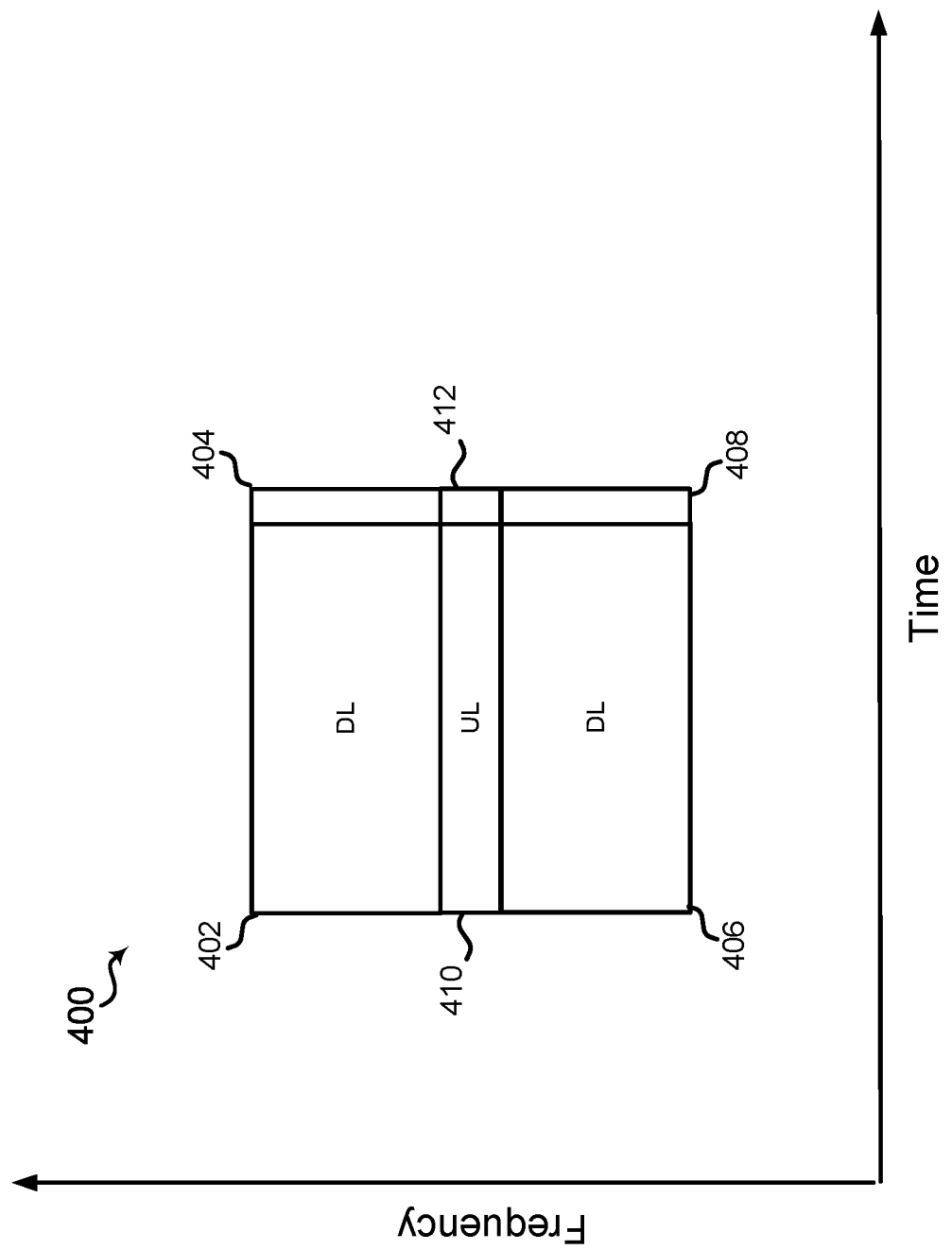
FIG. 4 is schematic diagram of a first example of a subband full duplex (SB-FD) slot.

Referring now to FIG. 4, in some implementations, the processor, 312, the memory 316, the modem 320, and/or the configuration component 324 of the BS 105 may configure a subband full-duplex (SB-FD) slot 400 according to some aspects of the present disclosure. For example, the BS 105 may configure the SB-FD slot 400 having first DL data resource 402, first DL control resource 404, second DL data resource 406, second DL control resource 408, UL data resource 410, and UL control resource 412. The configuration may include the boundaries between the first DL data resource 402 and the UL data resource 410 and/or between the second DL resource 406 and the UL data resource 410. In the SB-FD slot 400, the UL data resource 410 may occupy one or more subbands of the SB-FD slot 400. The BS 105 may configure the SB-FD slot 400 via FDD within the component carrier bandwidth. The UL subband bandwidth of the UL data resource 410 (and the UL control resource 412) may be 5 Megahertz (MHz), 10 MHz, 20 MHz, 30 MHz, 40 MHz, or other suitable bandwidths. The DL subband bandwidth of the first DL data resource 402 and the second data resource 406 may be 40 MHz, 50 MHz, 60 MHz, 80 MHz, 100 MHz, or other suitable bandwidths. Other subband bandwidth values for the UL subband(s) and/or the DL subband(s) are possible. In some aspects, the BS 105 may partition the DL subband(s) and the UL subband(s) within the SB-FD slot 400 based on interference alignment between the BS 105 and operators.

Figure 5:
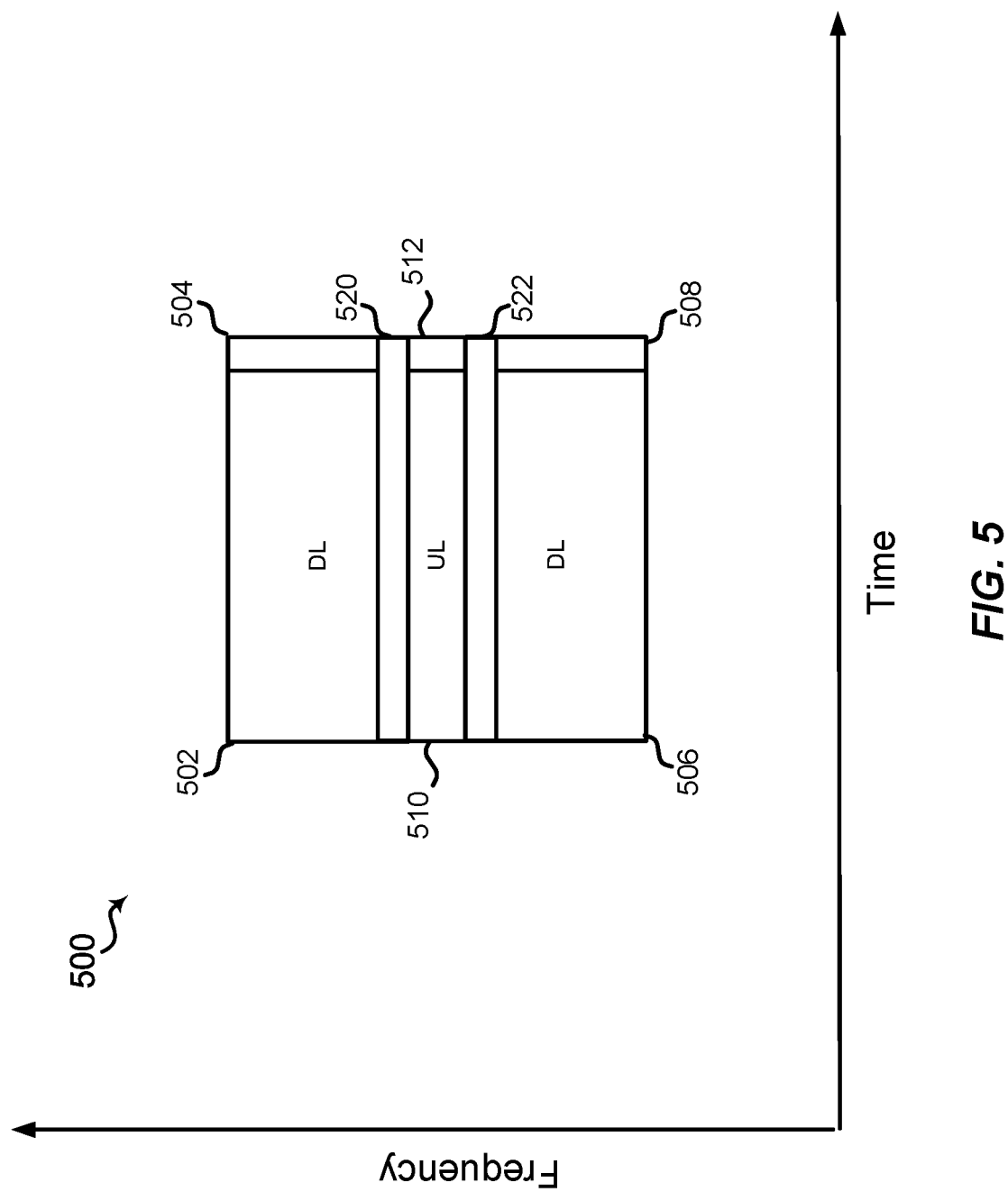
FIG. 5 is a schematic diagram of a second example of a SB-FD slot.

Referring now to FIG. 5, in some implementations, the processor, 312, the memory 316, the modem 320, and/or the configuration component 324 of the BS 105 may configure a SB-FD slot 500 according to some aspects of the present disclosure. For example, the BS 105 may configure the SB-FD slot 500 having first DL data resource 502, first DL control resource 504, second DL data resource 506, second DL control resource 508, UL data resource 510, and UL control resource 512. The BS 105 may configure the SB-FD slot 500 by inserting a first guard band 520 between the first DL data resource 502 and the UL data resource 510, and a second guard band 522 between the second DL data resource 506 and the UL data resource 510. In the SB-FD slot 500, the UL data resource 510 may occupy one or more subbands of the SB-FD slot 500. The BS 105 may configure the SB-FD slot 500 via FDD within the component carrier bandwidth. The UL subband bandwidth of the UL data resource 510 (and the UL control resource 512) may be 5 MHz, 10 MHz, 20 MHz, 30 MHz, 50 MHz, or other suitable bandwidths. The DL subband bandwidth of the first DL data resource 502 and the second data resource 506 may be 40 MHz, 50 MHz, 60 MHz, 80 MHz, 100 MHz, or other suitable bandwidths. Other bandwidth values for the UL subband(s) and/or the DL subband(s) are possible. In some aspects, the BS 105 may partition the DL subband(s) and the UL subband(s) within the SB-FD slot 500 based on interference alignment between the BS 105 and operators.

Figure 6:
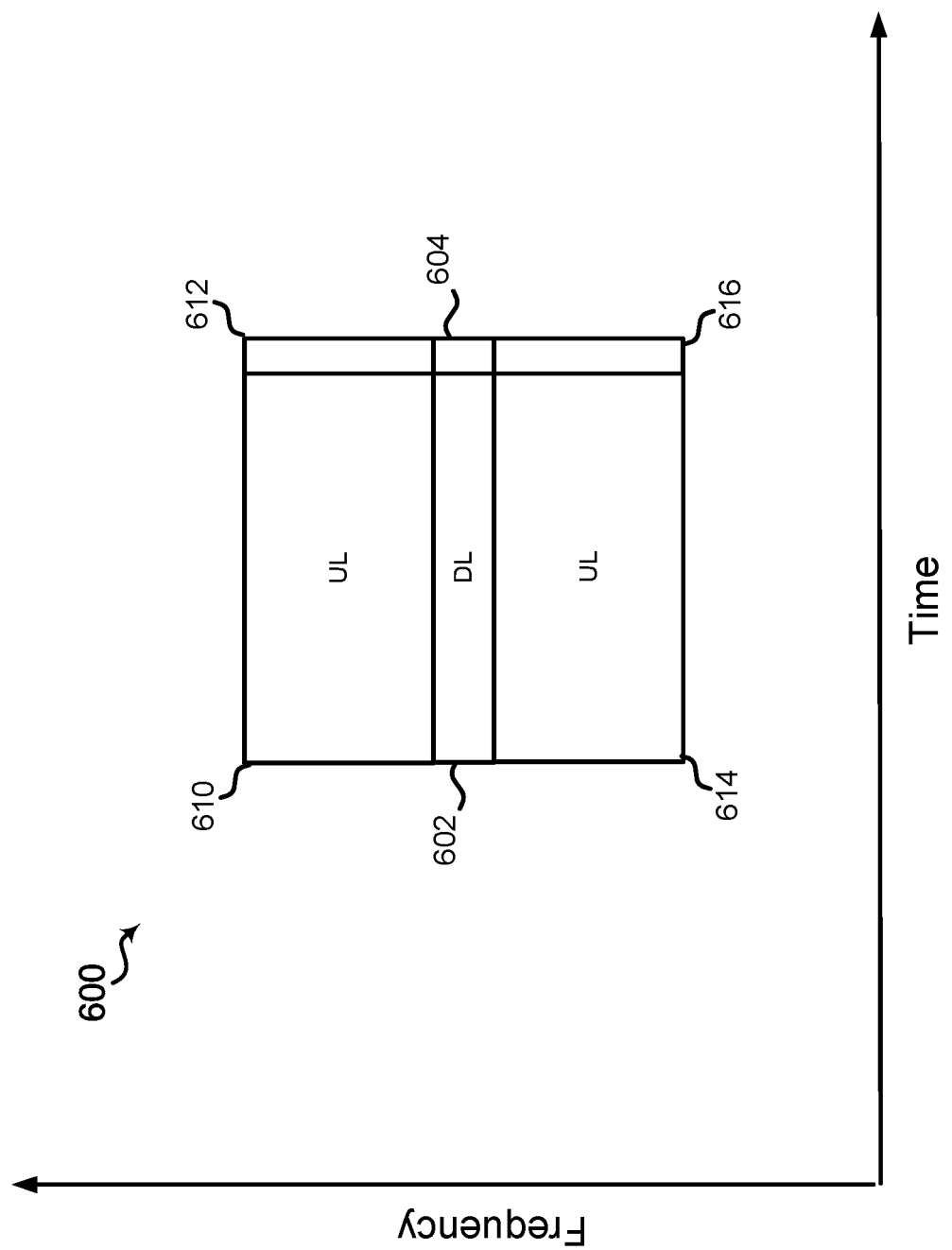
FIG. 6 is a schematic diagram of a third example of a SB-FD slot.

Referring now to FIG. 6, in some implementations, the processor, 312, the memory 316, the modem 320, and/or the configuration component 324 of the BS 105 may configure a SB-FD slot 600 according to some aspects of the present disclosure. For example, the BS 105 may configure the SB-FD slot 600 having DL data resource 602, DL control resource 604, first UL data resource 610, first UL control resource 612, second UL data resource 614, and second UL control resource 616. In the SB-FD slot 600, the first UL data resource 610 may occupy a set of subbands of the SB-FD slot 600. The second UL data resource 614 may occupy a different set of subbands of the SB-FD slot 600. The BS 105 may configure the SB-FD slot 600 via FDD within the component carrier bandwidth. The UL subband bandwidth of the first UL data resource 610 and/or the second UL data resource 614 may be 20 MHz, 40 MHz, 60 MHz, 80 MHz, or other suitable bandwidths. The DL subband bandwidth of the DL data resource 602 may be 10 MHz, 20 MHz, 30 MHz, 40 MHz, or other suitable bandwidths. Other bandwidth values for the UL subband(s) and/or the DL subband(s) are possible. In some aspects, the BS 105 may partition the DL subband(s) and the UL subband(s) within the SB-FD slot 600 based on interference alignment between the BS 105 and operators.

Figure 7:
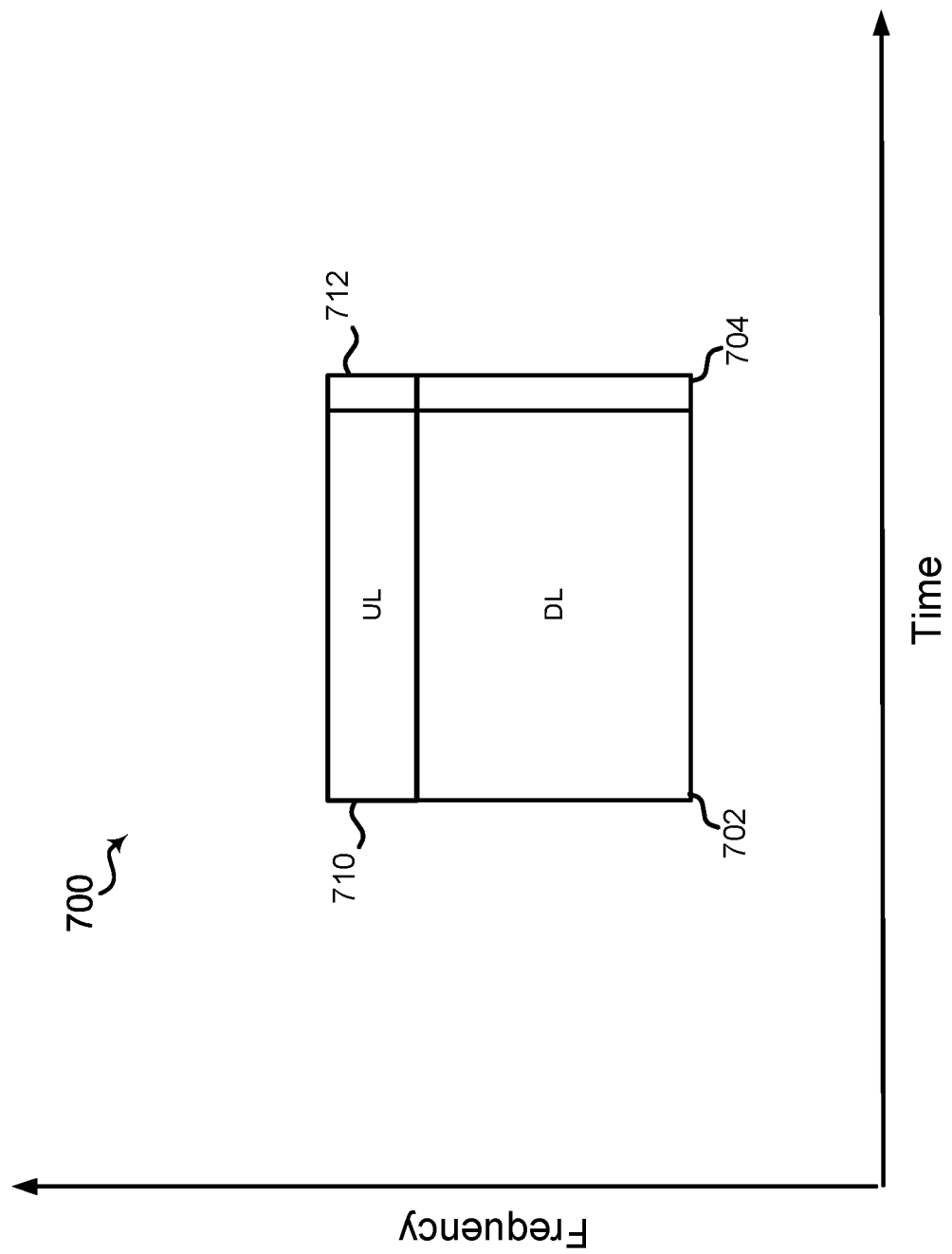
FIG. 7 is a schematic diagram of a fourth example of a SB-FD slot.

Referring now to FIG. 7, in some implementations, the processor, 312, the memory 316, the modem 320, and/or the configuration component 324 of the BS 105 may configure a SB-FD slot 700 according to some aspects of the present disclosure. For example, the BS 105 may configure the SB-FD slot 700 having DL data resource 702, DL control resource 704, UL data resource 710, and UL control resource 712. In the SB-FD slot 700, the UL data resource 710 may occupy a set of subbands of the SB-FD slot 700. The BS 105 may configure the SB-FD slot 700 via FDD within the component carrier bandwidth. The UL subband bandwidth of the UL data resource 710 may be 5 MHz, 20 MHz, 40 MHz, 60 MHz, 80 MHz, or other suitable bandwidths. The DL subband bandwidth of the DL data resource 702 may be 20 MHz, 40 MHz, 60 MHz, 80 MHz, or other suitable bandwidths. Other bandwidth values for the UL subband(s) and/or the DL subband(s) are possible. In some aspects, the BS 105 may partition the DL subband(s) and the UL subband(s) within the SB-FD slot 700 based on interference alignment between the BS 105 and operators.

Figure 8:
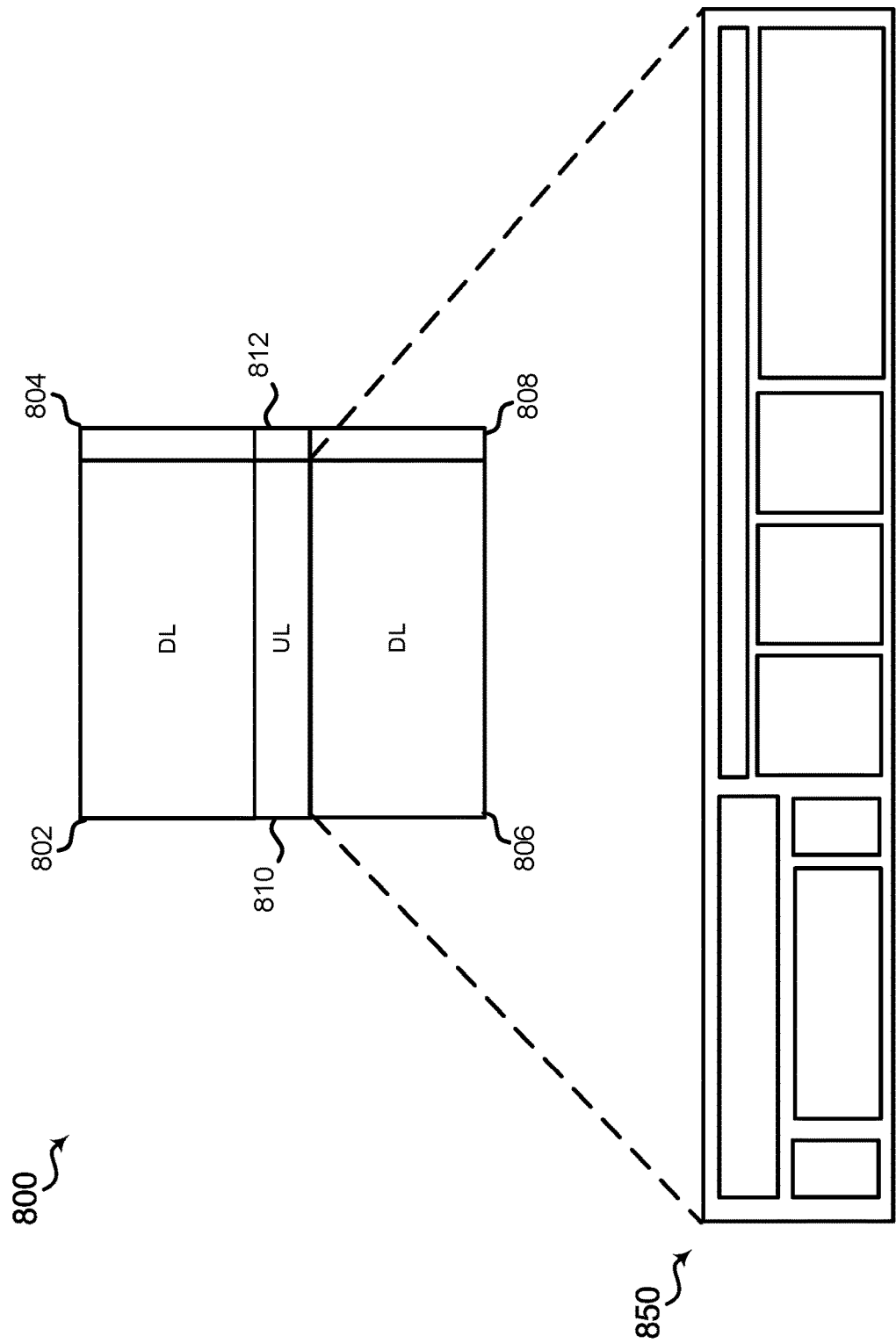
FIG. 8 is a schematic diagram of an example of resource set for a SB-FD slot.

Referring now to FIG. 8, in some implementations, the processor, 312, the memory 316, the modem 320, and/or the configuration component 324 of the BS 105 may configure a subband full-duplex (SB-FD) slot 800 according to some aspects of the present disclosure. For example, the BS 105 may configure the SB-FD slot 800 having first DL data resource 802, first DL control resource 804, second DL data resource 806, second DL control resource 808, UL data resource 810, and UL control resource 812. In the SB-FD slot 800, the UL data resource 810 may occupy one or more subbands of the SB-FD slot 800. The BS 105 may configure the SB-FD slot 800 via FDD within the component carrier bandwidth. The UL subband bandwidth of the UL data resource 810 (and the UL control resource 812) may be 5 Megahertz (MHz), 10 MHz, 20 MHz, 30 MHz, 40 MHz, or other suitable bandwidths. The DL subband bandwidth of the first DL data resource 802 and the second data resource 806 may be 40 MHz, 50 MHz, 60 MHz, 80 MHz, 100 MHz, or other suitable bandwidths. Other bandwidth values for the UL subband(s) and/or the DL subband(s) are possible. In some aspects, the BS 105 may partition the DL subband(s) and the UL subband(s) within the SB-FD slot 800 based on interference alignment between the BS 105 and operators.

In some aspects, the BS 105 may configure at least a portion of a resource set 850 associated with the UL transmission resource 810 for the UE 110 to transmit UL PUCCH. For example, the BS 105 may transmit a radio resource control (RRC) to the UE 110. The RRC may include an indication to the UE 110 which portion of the resource set 850 (e.g., symbol range, resource block range, slot numbers) the UE 110 may use for transmitting UL control information. In a non-limiting example, the BS 105 may dynamically indicate UL control resources such as Hybrid Automatic Repeat Request (HARD) Acknowledgement (ACK) to the UE 110 via one or more indicators (e.g., PUCCH resource indicator having 3 bits). In other non-limiting examples, the BS 105 may semi-statically configure UL control resources such as scheduling requests and/or channel state indicators, and/or the periodicity of the resources. In some instances, the periodicity of the resources in a SB-FD slot may be calculated based on the frequency of SB-FD slots. Similarly, the periodicity of the resources in a "legacy" slot (e.g., not SB-FD slot) may be calculated based on the frequency of "legacy" slots.

In one example, the resource set 850 may be allocated for PUCCH. A different (not shown) resource set in a "legacy" slot may also be allocated for PUCCH. The resource set 850 and the different resource set in the "legacy" slot may be different.

Figure 9:
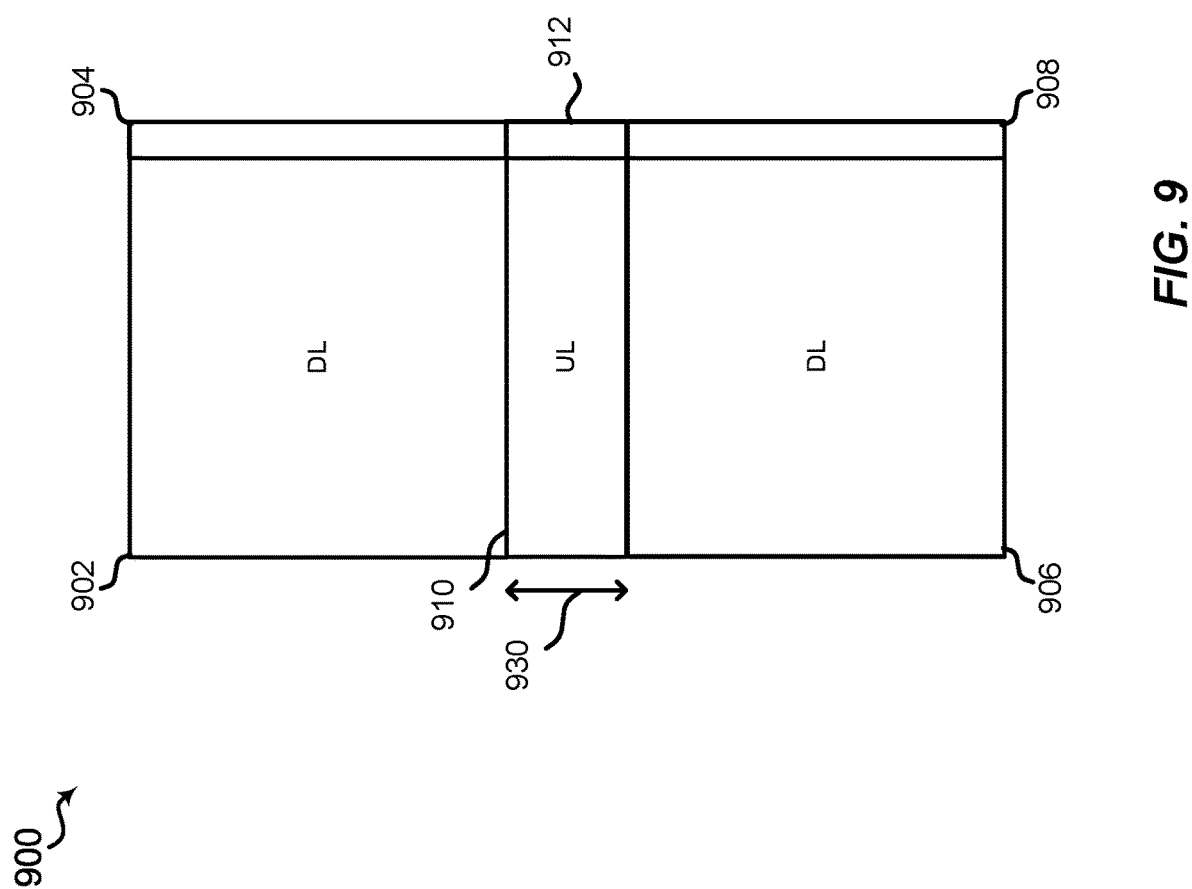
FIG. 9 is a schematic diagram of an example of a first configuration of a SB-FD slot.

Referring now to FIG. 9, in some implementations, the processor, 312, the memory 316, the modem 320, and/or the configuration component 324 of the BS 105 may configure a subband full-duplex (SB-FD) slot 900 according to some aspects of the present disclosure. For example, the BS 105 may configure the SB-FD slot 900 having first DL data resource 902, first DL control resource 904, second DL data resource 906, second DL control resource 908, UL data resource 910, and UL control resource 912. In the SB-FD slot 900, the UL data resource 910 may occupy one or more subbands of the SB-FD slot 900. The BS 105 may configure the SB-FD slot 900 via FDD within the component carrier bandwidth. The UL subband bandwidth of the UL data resource 910 (and the UL control resource 912) may be 5 Megahertz (MHz), 10 MHz, 20 MHz, 30 MHz, 40 MHz, or other suitable bandwidths. The DL subband bandwidth of the first DL data resource 902 and the second data resource 906 may be 40 MHz, 50 MHz, 60 MHz, 80 MHz, 100 MHz, or other suitable bandwidths. Other bandwidth values for the UL subband(s) and/or the DL subband(s) are possible. In some aspects, the BS 105 may partition the DL subband(s) and the UL subband(s) within the SB-FD slot 900 based on interference alignment between the BS 105 and operators.

In certain implementations, the BS 105 may configure the SB-FD slot 900 via the RRC. Prior to configuring an uplink resource set, the BS 105 may transmit an indication to the UE 110 to allow the UE 110 to select one or more resources for UL transmission, such as PUCCH, within the SB-FD slot 900. For example, the BS 105 may indicate a subband size 930 to the UE 110. The subband size 930 may be a number of resource blocks of the UL subband configured for the SB-FD slot 900. The UE 110 may rely on the subband size 930 to determine the one or more resources for UL transmission within the SB-FD slot 900.

Figure 10:
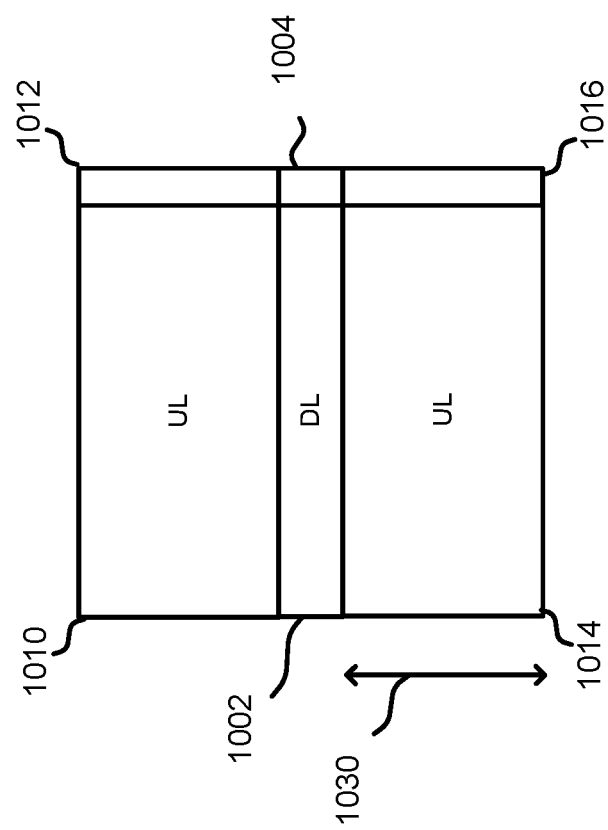
FIG. 10 is a schematic diagram of an example of a second configuration of a SB-FD slot.

Referring now to FIG. 10, in some implementations, the processor, 312, the memory 316, the modem 320, and/or the configuration component 324 of the BS 105 may configure a SB-FD slot 1000 according to some aspects of the present disclosure. For example, the BS 105 may configure the SB-FD slot 1000 having DL data resource 1002, DL control resource 1004, first UL data resource 1010, first UL control resource 1012, second UL data resource 1014, and second UL control resource 1016. In the SB-FD slot 1000, the first UL data resource 1010 may occupy a set of subbands of the SB-FD slot 1000. The second UL data resource 1014 may occupy a different set of subbands of the SB-FD slot 1000. The BS 105 may configure the SB-FD slot 1000 via FDD within the component carrier bandwidth. The UL subband bandwidth of the first UL data resource 1010 and/or the second UL data resource 1014 may be 20 MHz, 40 MHz, 60 MHz, 80 MHz, or other suitable bandwidths. The DL subband bandwidth of the DL data resource 1002 may be 10 MHz, 20 MHz, 30 MHz, 40 MHz, or other suitable bandwidths. Other bandwidth values for the UL subband(s) and/or the DL subband(s) are possible. In some aspects, the BS 105 may partition the DL subband(s) and the UL ban subband(s) within the SB-FD slot 1000 based on interference alignment between the BS 105 and operators.

In an implementation, the BS 105 may configure the SB-FD slot 1000 via the RRC. Prior to configuring an uplink resource set, the BS 105 may transmit an indication to the UE 110 to allow the UE 110 to select one or more resources for UL transmission, such as PUCCH, within the SB-FD slot 1000. For example, the BS 105 may select the second UL data resource 1014 for UL transmission. The BS 105 may indicate the selection of the second UL data resource 1014 for UL transmission and a subband size 1030 (of the second UL data resource 1014) to the UE 110. The subband size 1030 may be a number of resource blocks of the second UL data resource 1014 configured for the SB-FD slot 1000. The UE 110 may rely on the subband size 1030 to determine the one or more resources for UL transmission within the SB-FD slot 1000.

Figure 11:
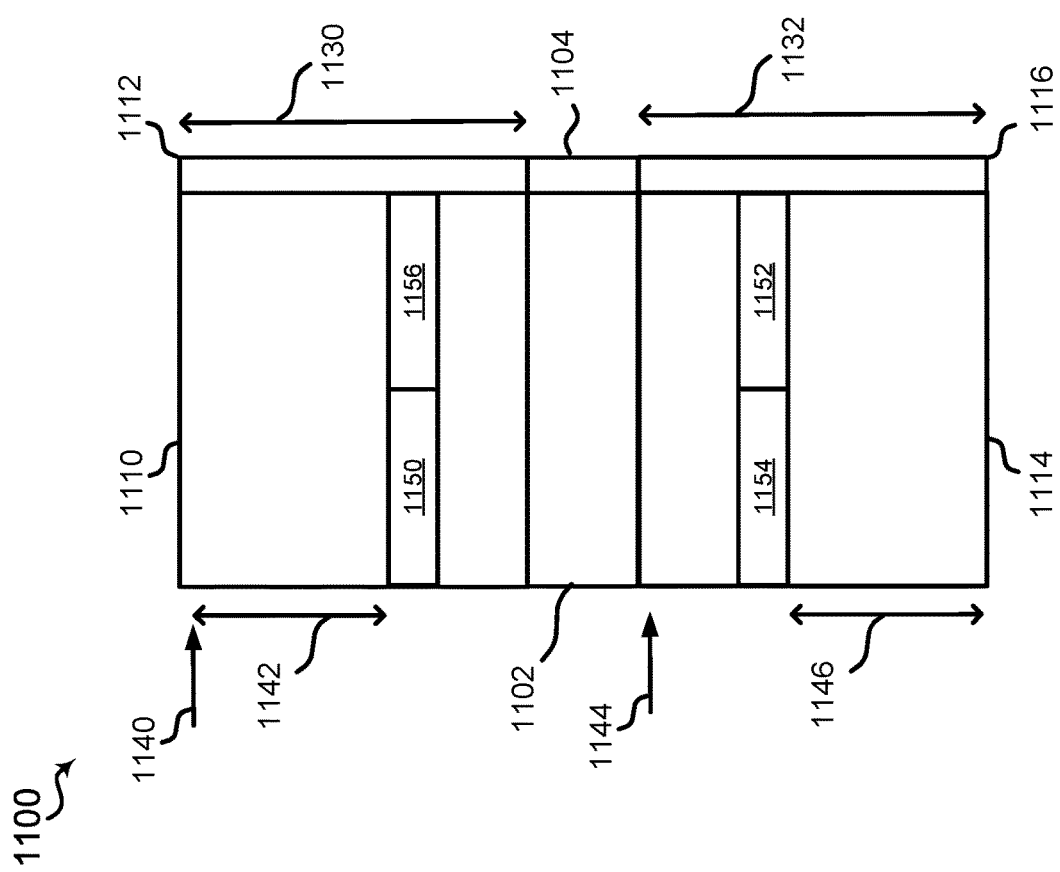
FIG. 11 is a schematic diagram of an example of a third configuration of a SB-FD slot.

Referring now to FIG. 11, in some implementations, the processor, 312, the memory 316, the modem 320, and/or the configuration component 324 of the BS 105 may configure a SB-FD slot 1100 according to some aspects of the present disclosure. For example, the BS 105 may configure the SB-FD slot 1100 having DL data resource 1102, DL control resource 1104, first UL data resource 1110, first UL control resource 1112, second UL data resource 1114, and second UL control resource 1116. In the SB-FD slot 1100, the first UL data resource 1110 may occupy a set of subbands of the SB-FD slot 1100. The second UL data resource 1114 may occupy a different set of subbands of the SB-FD slot 1100. The BS 105 may configure the SB-FD slot 1100 via FDD within the component carrier bandwidth. The UL subband bandwidth of the first UL data resource 1110 and/or the second UL data resource 1114 may be 20 MHz, 40 MHz, 60 MHz, 80 MHz, or other suitable bandwidths. The DL subband bandwidth of the DL data resource 1102 may be 10 MHz, 20 MHz, 30 MHz, 40 MHz, or other suitable bandwidths. Other bandwidth values for the UL subband(s) and/or the DL subband(s) are possible. In some aspects, the BS 105 may partition the DL subband(s) and the UL subband(s) within the SB-FD slot 1100 based on interference alignment between the BS 105 and operators.

In an implementation, the BS 105 may configure the SB-FD slot 1100 via the RRC. Prior to configuring an uplink resource set, the BS 105 may transmit an indication to the UE 110 to allow the UE 110 to select one or more resources for UL transmission within the SB-FD slot 1100. In one example, the BS 105 may transmit an indication indicating that the UE 110 is to transmit UL data in a first resource 1150 and a second resource 1152. The BS 105 may assign the first resource 1150 and the second resource 1152 so the UE 110 may implement frequency hopping to diversify transmissions. The indication may include one or more of a first subband size 1130, a second subband size 1132, a first starting subband value 1140 and a first offset 1142, a second starting subband value 1144, and/or a second offset 1146. In some implementations, the BS 105 may not transmit the first offset 1142 or the second offset 1146, and the UE 110 may locally (at the UE) retrieve the first offset 1142 and the second offset 1146. The UE 110, upon receiving the indication, may locate the first resource 1150 by adding the first offset 1142 to the starting subband value 1140. In one implementation, for $\lfloor r_{PUCCH}/8 \rfloor = 0$, the UE 110 may use the equation $RB_{SB1}^{start} + RB_{BW}^{offset1} + \lfloor r_{PUCCH}/N_{CS} \rfloor$ to compute the UL transmission in the first hop (i.e., in the first resource 1150), wherein $RB_{SB1}^{start}$ is the first starting subband value 1140, $RB_{BW}^{offset1}$ is the first offset 1142, $r_{PUCCH}$ is the UL channel index (e.g., PUCCH index), and $N_{CS}$ is the total number of initial cyclic shift indexes in the set of initial cyclic shift indexes.

The UE 110 may locate the second resource 1152 by subtracting the second offset 1146 from the sum of the second subband size 1132 and the second starting subband value 1144. In one implementation, the UE 110 may use the equation $RB_{SB2}^{size} - 1 - RB_{BW}^{offset2} - \lfloor r_{PUCCH}/N_{CS} \rfloor$ to compute the UL transmission in the second hop (i.e., in the second resource 1152), wherein $RB_{SB2}^{start}$ is the second starting subband value 1144, $N_{SB2}^{size}$ is the second subband size 1132, $RB_{BW}^{offset2}$ is the second offset 1146, $r_{PUCCH}$ is the UL channel index (e.g., PUCCH index), and $N_{CS}$ is the total number of initial cyclic shift indexes in the set of initial cyclic shift indexes. In certain instances, the UE 110 may determine the initial cyclic shift index in the set of initial cyclic shift indexes as $r_{PUCCH} \mod N_{CS}$.

In another example, the BS 105 may transmit an indication indicating that the UE 110 is to transmit UL data in a third resource 1154 and a fourth resource 1156. The BS 105 may assign the third resource 1154 and the fourth resource 1156 so the UE 110 may implement frequency hopping to diversify transmissions. The indication may include one or more of the first subband size 1130, the second subband size 1132, the first starting subband value 1140 and the first offset 1142, the second starting subband value 1144, and/or the second offset 1146. The UE 110, upon receiving the indication, may locate the third resource 1154 by subtracting the second offset 1146 from the sum of the second subband size 1132 and the second starting subband value 1144. In one implementation, for $\lfloor r_{PUCCH}/8 \rfloor = 1$, the UE 110 may use the equation $RB_{SB2}^{start} + N_{SB2}^{size} - 1 - RB_{BW}^{offset2} - \lfloor r_{PUCCH}/N_{CS} \rfloor$ to compute the UL transmission in the first hop (i.e., in the third resource 1154). The UE 110 may use the equation $RB_{SB1}^{start} + RB_{BW}^{offset1} + \lfloor r_{PUCCH}/N_{CS} \rfloor$ to compute the UL transmission in the second hop (i.e., in the fourth resource 1156). In certain instances, the UE 110 may determine the initial cyclic shift index in the set of initial cyclic shift indexes as $(r_{PUCCH} - 8) \mod N_{CS}$.

Specifically, in some implementations, if $\lfloor r_{PUCCH}/8 \rfloor = 0$, and a UE is provided a PUCCH resource by pucch-ResourceCommon and is not provided useInterlacePUCCHCommon-r16: the UE determines the PRB index of the PUCCH transmission in the first hop as $RB_{SB1}^{start} + RB_{BW}^{offset1} + \lfloor r_{PUCCH}/N_{CS} \rfloor$ and the PRB index of the PUCCH transmission in the second hop as $RB_{SB2}^{start} + N_{SB2}^{size} - 1 - RB_{BW}^{offset2} - \lfloor r_{PUCCH}/N_{CS} \rfloor$, where $N_{CS}$ is the total number of initial cyclic shift indexes in the set of initial cyclic shift indexes, and the UE determines the initial cyclic shift index in the set of initial cyclic shift indexes as $r_{PUCCH} \mod N_{CS}$.

In certain implementations, if $\lfloor r_{PUCCH}/8 \rfloor = 1$ and a UE is provided a PUCCH resource by pucch-ResourceCommon and is not provided useInterlacePUCCHCommon-r16: the UE determines the PRB index of the PUCCH transmission in the first hop as $RB_{SB2}^{start} + N_{SB2}^{size} - 1 - RB_{BW}^{offset2} - \lfloor r_{PUCCH}/N_{CS} \rfloor$ and the PRB index of the PUCCH transmission in the second hop as $RB_{SB1}^{start} + RB_{BW}^{offset1} + \lfloor r_{PUCCH}/N_{CS} \rfloor$, and the UE determines the initial cyclic shift index in the set of initial cyclic shift indexes as $(r_{PUCCH} - 8) \mod N_{CS}$.

In alternative implementations, the BS 105 may configure a SB-FD slot having three or more UL subbands. The BS 105 may select a subband and utilize methods described with respect to FIG. 10 to configure the UE 110 for UL transmission, or select two subbands and utilize methods described with respect to FIG. 11 to configure the UE 110. Other structures of the SB-FD slot are possible, and the BS 105 may use methods described above to configure the UE 110.

Figure 12A:
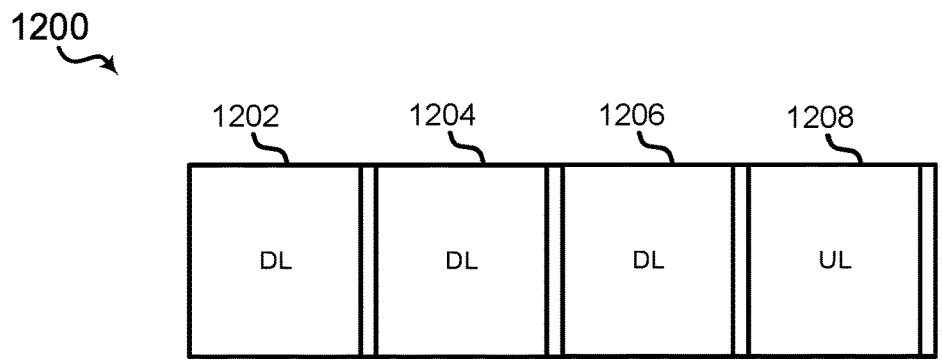
FIGS. 12A-D are schematic diagrams of transmission schemes.

Turning to FIG. 12A, an example of a first transmission scheme 1200 based on conventional slots may include a first DL slot 1202, a second DL slot 1204, a third DL slot 1206, and a UL slot 1208. The UE may receive DL information (data and/or control) in the first DL slot 1202, the second DL slot 1204, and/or the third DL slot 1206. The UE may transmit UL information (data and/or control) in the UL slot 1208. If the UE receives any DL information in the first DL slot 1202, the second DL slot 1204, and/or the third DL slot 1206, the UE may postpone response (in necessary) until the UL slot 1208 (or later).

Figure 12B:
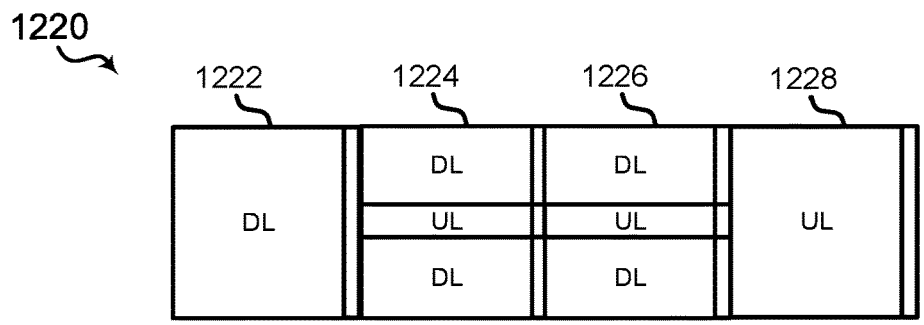

Turning to FIG. 12B, an example of a second transmission scheme 1220 may include a DL slot 1222, a first SB-FD slot 1224, a second SB-FD slot 1226, and a UL slot 1228. The UE may receive DL information (data and/or control) in the DL slot 1222, the first SB-FD slot 1224, and/or the second SB-FD slot 1226. The UE may transmit UL information (data and/or control) in the first SB-FD slot 1224, the second SB-FD slot 1226, and/or the UL slot 1228. If the UE receives any DL information in the DL slot 1222, the UE may respond during the first SB-FD slot 1224 instead of postponing to the UL slot 1228. If the UE receives any DL information in the first SB-FD slot 1224, and/or the second SB-FD slot 1226, the UE may respond in the same slot as the received information instead of postponing to the UL slot 1228.

Figure 12C:
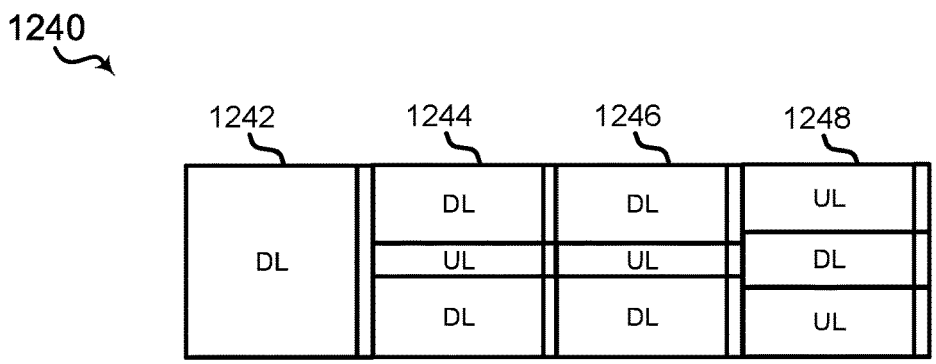

Turning to FIG. 12C, an example of a third transmission scheme 1240 may include a DL slot 1242, a first SB-FD slot 1244, a second SB-FD slot 1246, and a third SB-FD slot 1248. The UE may receive DL information (data and/or control) in the DL slot 1242, the first SB-FD slot 1244, the second SB-FD slot 1246, and/or the third SB-FD slot 1248. The UE may transmit UL information (data and/or control) in the first SB-FD slot 1244, the second SB-FD slot 1246, and/or the third SB-FD slot 1248. If the UE receives any DL information in the DL slot 1242, the UE may respond during the first SB-FD slot 1244. If the UE receives any DL information in the first SB-FD slot 1244, the second SB-FD slot 1246, and/or the third SB-FD slot 1248, the UE may respond in the same slot as the received information instead of postponing to the UL slot 1248. The third SB-FD slot 1248 may allocate more UL resources than the first SB-FD slot 1244 and/or the second SB-FD slot 1246.

Figure 12D:
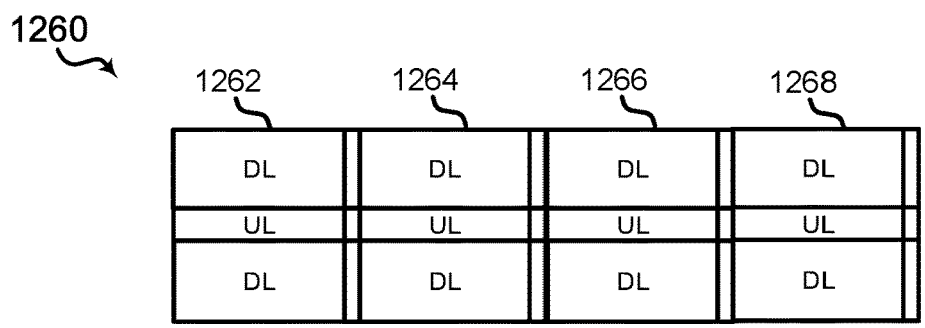

Turning to FIG. 12D, an example of a fourth transmission scheme 1260 may include a first SB-FD slot 1262, a second SB-FD slot 1264, a third SB-FD slot 1266, and a fourth SB-FD slot 1268. The UE may receive DL information (data and/or control) in the first SB-FD slot 1262, the second SB-FD slot 1264, the third SB-FD slot 1266, and/or the fourth SB-FD slot 1268. The UE may transmit UL information (data and/or control) in the first SB-FD slot 1262, the second SB-FD slot 1264, the third SB-FD slot 1266, and/or the fourth SB-FD slot 1268.

In some implementations, the BS 105 may select a resource set for uplink transmission. For example, the BS 105 may select a SB-FD resource for uplink transmission or a UL resource for uplink transmission. In another example, the UE 110 may select a SB-FD resource for uplink transmission or a UL resource for uplink transmission. The UE 110 may be configured to distinguish a SB-FD slot and a UL slot based on the slot configuration.

Referring to FIG. 13, an example of a method 1300 for configuring a SB-FD slot may be performed by the communication component 322, the configuration component 334, the modem 320, the processor 312, and/or the memory 316 of the BS 105 in the wireless communication network 100.

At block 1305, the method 1300 may configure at least one subband comprising subband full-duplex (SB-FD) resource for an uplink transmission associated with a user equipment (UE), wherein the SB-FD resource overlap at least partially with a downlink transmission in a time domain. For example, the configuration component 324, the modem 320, the processor 312, and/or the memory 316 of the BS 105 may configure the UL data resource 410 in the SB-FD slot 400. The SB-FD slot 400 may be configured to include the first DL data resource 402, the first DL control resource 404, the second DL data resource 406, the second DL control resource 408, the UL data resource 410, and the UL control resource 412. The configuration may include the boundaries between the first DL data resource 402 and the UL data resource 410 and/or between the second DL resource 406 and the UL data resource 410. In the SB-FD slot 400, the UL data resource 410 may occupy one or more subbands of the SB-FD slot 400.

In certain implementations, the processor 312, the modem 320, the configuration component 324, the transceiver 302, the receiver 306, the transmitter 308, the RF front end 388, and/or the subcomponents of the RF front end 388 may be configured to and/or may define means for configuring at least one subband comprising subband full-duplex (SB-FD) resource for an uplink transmission associated with a user equipment (UE), wherein the SB-FD resource overlap at least partially with a downlink transmission in a time domain.

At block 1310, the method 1300 may transmit a configuration message for the subband full-duplex resource for the uplink transmission. For example, the communication component 322, the modem 320, and/or the processor 312 of the BS 105 may transmit a configuration message (e.g., the RRC, downlink control indicator (DCI), etc) for the subband full-duplex resource for the uplink transmission. The communication component 322 may send the configuration message to the transceiver 302 or the transmitter 308. The transceiver 302 or the transmitter 308 may convert the configuration message to electrical signals and send to the RF front end 388. The RF front end 388 may filter and/or amplify the electrical signals. The RF front end 388 may send the electrical signals as electro-magnetic signals via the one or more antennas 365.

In certain implementations, the processor 312, the modem 320, the communication component 322, the transceiver 302, the receiver 306, the transmitter 308, the RF front end 388, and/or the subcomponents of the RF front end 388 may be configured to and/or may define means for transmitting an indication for the subband full-duplex resource for the uplink transmission.

Alternatively or additionally, the method 1300 may further include any of the methods above, wherein transmitting the configuration message comprises transmitting a radio resource control (RRC) configuration indicating the SB-FD resource for the uplink transmission.

Alternatively or additionally, the method 1300 may further include any of the methods above, further comprising configuring a first uplink transmission resource set in the SB-FD resource, wherein the configuration message comprises the second uplink transmission resource set.

Alternatively or additionally, the method 1300 may further include any of the methods above, further comprising configuring a second uplink transmission resource set in uplink resource different than the SB-FD resource, wherein the configuration message further comprises the second uplink transmission resource set.

Alternatively or additionally, the method 1300 may further include any of the methods above, further comprising transmitting a selection indicator indicating to the UE to use the first uplink transmission resource set or the second uplink transmission resource set.

Alternatively or additionally, the method 1300 may further include any of the methods above, wherein transmitting the configuration message comprises transmitting a subband size associated with the subband and further comprising configuring one or more uplink transmission resource set in the SB-FD resource.

Alternatively or additionally, the method 1300 may further include any of the methods above, wherein configuring the at least one subband comprises configuring two subbands comprising the SB-FD resource.

Alternatively or additionally, the method 1300 may further include any of the methods above, further comprising, prior to configuring the two subbands, selecting one of the two subbands for the uplink transmission, wherein transmitting the configuration message comprises transmitting a selection of the one of the two subbands and a subband size associated with the selected one of the two subbands and further comprising configuring one or more uplink transmission resource set in the SB-FD resource.

Alternatively or additionally, the method 1300 may further include any of the methods above, transmitting, if the SB-FD resource is in a first subband of the two subbands, a first starting RB index for the first subband to indicate a starting resource position of the SB-FD resource or transmitting, if the SB-FD resource is in a second subband of the two subbands, a second starting RB index for the second subband and a subband size of the second subband to indicate the starting resource position of the SB-FD resource.

Alternatively or additionally, the method 1300 may further include any of the methods above, wherein configuring the at least one subband comprises configuring three or more subbands comprising the SB-FD resource.

Alternatively or additionally, the method 1300 may further include any of the methods above, further comprising, prior to configuring the three or more subbands, selecting one of the three or more subbands for the uplink transmission, wherein transmitting the configuration message comprises transmitting a selection of the one of the three or more subbands and a subband size associated with the selected one of the three or more subbands and further comprising configuring one or more uplink transmission resource set in the SB-FD resource.

Alternatively or additionally, the method 1300 may further include any of the methods above, further comprising, prior to configuring the three or more subbands, selecting a first subband and a second subband of the three or more subbands for the uplink transmission, wherein transmitting the configuration message comprises transmitting, if the SB-FD resource is in the first subband of the two selected subbands, a starting RB index for the first subband to indicate a starting resource position of the SB-FD resource or transmitting, if the SB-FD resource is in the second subband of the two selected subbands, a second starting RB index for the first subband and a subband size of the second subband to indicate the starting resource position of the SB-FD resource.

Alternatively or additionally, the method 1300 may further include any of the methods above, wherein the uplink transmission is a physical uplink control channel (PUCCH) transmission or a physical uplink shared channel (PUSCH) transmission.

Referring to FIG. 14, an example of a method 1400 for receiving a configuration and transmitting via a SB-FD slot may be performed by the communication component 222, the modem 220, the processor 212, and/or the memory 216 of the BS 105 in the wireless communication network 100.

At block 1405, the method 1400 may receive a configuration message associated with at least one subband comprising a subband full-duplex (SB-FD) resource for an uplink transmission, wherein the SB-FD resource overlap at least partially with a downlink data in a time domain. For example, the communication component 222, the modem 220, and/or the processor 212 of the UE 110 may receive the configuration message (e.g., RRC or DCI) that configures the UL data resource 410 in the SB-FD slot 400. The SB-FD slot 400 may be configured to include the first DL data resource 402, the first DL control resource 404, the second DL data resource 406, the second DL control resource 408, the UL data resource 410, and the UL control resource 412. The configuration may include the boundaries between the first DL data resource 402 and the UL data resource 410 and/or between the second DL resource 406 and the UL data resource 410. In the SB-FD slot 400, the UL data resource 410 may occupy one or more subbands of the SB-FD slot 400. The one or more antennas 265 may receive electromagnetic signals from one or more antennas 265 of the UE 110. The RF front end 288 may filter, amplify, and/or extract electrical signals carried by the electro-magnetic signals. The transceiver 202 or the receiver 206 may digitize and convert the electrical signal into the data, such as the configuration message, and send to the communication component 222.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving, in response to transmitting a configuration message associated with at least one subband comprising a subband full-duplex (SB-FD) resource for an uplink transmission, wherein the SB-FD resource overlap at least partially with a downlink data in a time domain.

At block 1410, the method 1400 may transmit uplink data via the SB-FD resource. For example, the communication component 222, the modem 220, and/or the processor 212 of the UE 110 may transmit uplink data via the UL data resource 410. The communication component 222 may send the uplink data to the transceiver 202 or the transmitter 208. The transceiver 202 or the transmitter 208 may convert the uplink data to electrical signals and send to the RF front end 288. The RF front end 288 may filter and/or amplify the electrical signals. The RF front end 288 may send the electrical signals as electro-magnetic signals via the one or more antennas 265.

In certain implementations, the processor 212, the modem 220, the communication component 222, the transceiver 202, the receiver 206, the transmitter 208, the RF front end 288, and/or the subcomponents of the RF front end 288 may be configured to and/or may define means for transmitting uplink data via the SB-FD resource.

ADDITIONAL IMPLEMENTATIONS

In an aspect, a method includes configuring at least one subband comprising subband full-duplex (SB-FD) resource for an uplink transmission associated with a user equipment (UE), wherein the SB-FD resource overlap at least partially with a downlink transmission in a time domain and transmitting a configuration message for the subband full-duplex resource for the uplink transmission.

Any of the methods above, wherein transmitting the configuration message comprises transmitting a radio resource control (RRC) configuration indicating the SB-FD resource for the uplink transmission.

Any of the methods above, further comprising configuring one or more uplink transmission resource set in the SB-FD resource, wherein the configuration message comprises the one or more uplink transmission resource set.

Any of the methods above, further comprising configuring a second uplink transmission resource set in uplink resource different than the SB-FD resource, wherein the configuration message further comprises the second uplink transmission resource set.

Any of the methods above, further comprising transmitting a selection indicator indicating to the UE to use the first uplink transmission resource set or the second uplink transmission resource set.

Any of the methods above, wherein transmitting the configuration message comprises transmitting a subband size associated with the subband and further comprising configuring one or more uplink transmission resource set in the SB-FD resource.

Any of the methods above, wherein configuring the at least one subband comprises configuring two subbands comprising the SB-FD resource.

Any of the methods above, further comprising, prior to configuring the two subbands, selecting one of the two subbands for the uplink transmission, wherein transmitting the configuration message comprises transmitting a selection of the one of the two subbands and a subband size associated with the selected one of the two subbands and further comprising configuring one or more uplink transmission resource set in the SB-FD resource.

Any of the methods above, wherein transmitting the configuration message comprises transmitting, if the SB-FD resource is in a first subband of the two subbands, a first starting RB index for the first subband to indicate a starting resource position of the SB-FD resource or transmitting, if the SB-FD resource is in a second subband of the two subbands, a second starting RB index for the second subband and a subband size of the second subband to indicate the starting resource position of the SB-FD resource.

Any of the methods above, wherein configuring the at least one subband comprises configuring three or more subbands comprising the SB-FD resource.

Any of the methods above, further comprising, prior to configuring the three or more subbands, selecting one of the three or more subbands for the uplink transmission, wherein transmitting the configuration message comprises transmitting a selection of the one of the three or more subbands and a subband size associated with the selected one of the three or more subbands and further comprising configuring one or more uplink transmission resource set in the SB-FD resource.

Any of the methods above, further comprising, prior to configuring the three or more subbands, selecting a first subband and a second subband of the three or more subbands for the uplink transmission, wherein transmitting the configuration message comprises transmitting, if the SB-FD resource is in the first subband of the two selected subbands, a starting RB index for the first subband to indicate a starting resource position of the SB-FD resource or transmitting, if the SB-FD resource is in the second subband of the two selected subbands, a second starting RB index for the first subband and a subband size of the second subband to indicate the starting resource position of the SB-FD resource.

Any of the methods above, wherein the uplink transmission is a physical uplink control channel (PUCCH) transmission or a physical uplink shared channel (PUSCH) transmission.

In some aspects, a UE may include a memory comprising instructions, a transceiver, and one or more processors operatively coupled with the memory and the transceiver, the one or more processors configured to execute instructions in the memory to configure at least one subband comprising a subband full-duplex (SB-FD) resource for an uplink transmission associated with a user equipment (UE), wherein the SB-FD resource overlap at least partially with a downlink transmission in a time domain and transmit a configuration message for the subband full-duplex resource for the uplink transmission.

In certain aspects, a non-transitory computer readable medium having instructions stored therein that, when executed by one or more processors of a user equipment (UE), cause the one or more processors to configure at least one subband comprising a subband full-duplex (SB-FD) resource for an uplink transmission associated with a user equipment (UE), wherein the SB-FD resource overlap at least partially with a downlink transmission in a time domain and transmit a configuration message for the subband full-duplex resource for the uplink transmission.

In an aspect, a UE includes means for configuring at least one subband comprising subband full-duplex (SB-FD) resource for an uplink transmission associated with a user equipment (UE), wherein the SB-FD resource overlap at least partially with a downlink transmission in a time domain and means for transmitting a configuration message for the subband full-duplex resource for the uplink transmission.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
    receiving a configuration message associated with at least one subband comprising a subband full-duplex (SB-FD) resource in a slot for an uplink transmission associated with the UE, wherein the SB-FD resource overlaps at least partially with a downlink transmission in a time domain within the slot; and
    transmitting uplink data via the SB-FD resource.

2. The method of claim 1, wherein receiving the configuration message comprises receiving a radio resource control (RRC) configuration indicating the SB-FD resource for the uplink transmission.

3. The method of claim 1, wherein the configuration message further comprises a first resource indicator indicating a first uplink transmission resource set in the SB-FD resource.

4. The method of claim 3, wherein the configuration message further comprises a second resource indicator indicating a second uplink transmission resource set in uplink resource different the SB-FD resource.

5. The method of claim 4, further comprising receiving a selection indicator indicating to the UE to use the SB-FD resource or the uplink resource.

6. The method of claim 1, wherein the configuration message further comprises a subband size associated with a subband of the at least one subband and one or more uplink transmission resource set in the SB-FD resource.

7. The method of claim 1, wherein the at least one subband comprises two subbands comprising the SB-FD resource.

8. The method of claim 7, wherein the configuration message further comprises a selection of the one of the two subbands, a subband size associated with the selected one of the two subbands, and a resource indicator indicating one or more uplink transmission resource set in the SB-FD resource.

9. The method of claim 7,
    wherein the configuration message further comprises:
        if the SB-FD resource is in a first subband of the two subbands, a first starting RB index for the first subband and a subband size of the first subband to indicate a starting resource position of the SB-FD resource, or if the SB-FD resource is in a second subband of the two subbands, a second starting RB index for the second subband and a subband size of the second subband to indicate the starting resource position of the SB-FD resource;

further comprising:
retrieving an offset value;
calculating the starting resource position of the SB-FD resource based on:
the first starting RB index for the first subband, a subband size of the first subband, and the offset value if the SB-FD resource is in the first subband of the two subbands, or
the second starting RB index for the second subband, the subband size of the second subband, and the offset value if the SB-FD resource is in the second subband of the two subbands; and
wherein transmitting the uplink data further comprises transmitting the uplink data at the starting resource position of the SB-FD resource.

10. The method of claim 1, wherein the at least one subband comprises three subbands comprising the SB-FD resource.

11. The method of claim 10, wherein the configuration message further comprises a selection of the one of the three subbands, a subband size associated with the selected one of the three subbands, and a resource indicator indicating one or more uplink transmission resource set in the SB-FD resource.

12. The method of claim 10,
wherein the configuration message further comprises:
a selection indicator indicating a selection of a first subband and a second subband of the three subbands for the uplink transmission;
if the SB-FD resource is in a first subband of the two selected subbands, a first starting RB index for the first subband and a subband size of the first subband to indicate a starting resource position of the SB-FD resource, or
if the SB-FD resource is in a second subband of the two selected subbands, a second starting RB index for the second subband and a subband size of the second subband to indicate the starting resource position of the SB-FD resource;
further comprising:
retrieving an offset value;
calculating the starting resource position of the SB-FD resource based on:
the first starting RB index for the first subband, a subband size of the first subband, and the offset value if the SB-FD resource is in the first subband of the two selected subbands, or
the second starting RB index for the second subband, the subband size of the second subband, and the offset value if the SB-FD resource is in the second subband of the two selected subbands; and
wherein transmitting the uplink data further comprises transmitting the uplink data at the starting resource position of the SB-FD resource.

13. The method of claim 1, wherein the uplink transmission is a physical uplink control channel (PUCCH) transmission or a physical uplink shared channel (PUSCH) transmission.

14. A user equipment (UE), comprising:
a memory comprising instructions;
a transceiver; and
one or more processors operatively coupled with the memory and the transceiver, the one or more processors configured to execute instructions in the memory to:
receive a configuration message associated with at least one subband comprising subband full-duplex (SB-FD) resource in a slot for an uplink transmission associated with the UE, wherein the SB-FD resource overlaps at least partially with a downlink transmission in a time domain within the slot; and
transmit uplink data via the SB-FD resource.

15. The UE of claim 14, wherein the one or more processors are configured to execute instructions in the memory to receive a radio resource control (RRC) configuration indicating the SB-FD resource for the uplink transmission.

16. The UE of claim 14, wherein the configuration message further comprises a first resource indicator indicating a first uplink transmission resource set in the SB-FD resource.

17. The UE of claim 16, wherein the configuration message further comprises a second resource indicator indicating a second uplink transmission resource set in uplink resource different the SB-FD resource.

18. The UE of claim 17, wherein the one or more processors are further configured to receive a selection indicator indicating to the UE to use the SB-FD resource or the uplink resource.

19. The UE of claim 14, wherein the configuration message further comprises a subband size associated with a subband of the at least one subband and one or more uplink transmission resource set in the SB-FD resource.

20. The UE of claim 14, wherein the at least one subband comprises two subbands comprising the SB-FD resource.

21. The UE of claim 20, wherein the configuration message further comprises a selection of the one of the two subbands, a subband size associated with the selected one of the two subbands, and a resource indicator indicating one or more uplink transmission resource set in the SB-FD resource.

22. The UE of claim 20,
wherein the configuration message further comprises:
if the SB-FD resource is in a first subband of the two subbands, a first starting RB index for the first subband and a subband size of the first subband to indicate a starting resource position of the SB-FD resource, or
if the SB-FD resource is in a second subband of the two subbands, a second starting RB index for the second subband and a subband size of the second subband to indicate the starting resource position of the SB-FD resource;
wherein the one or more processors are further configured to:
retrieve an offset value;
calculate the starting resource position of the SB-FD resource based on:
the first starting RB index for the first subband, a subband size of the first subband, and the offset value if the SB-FD resource is in the first subband of the two subbands, or
the second starting RB index for the second subband, the subband size of the second subband, and the offset value if the SB-FD resource is in the second subband of the two subbands; and wherein transmitting the uplink data further comprises transmitting the uplink data at the starting resource position of the SB-FD resource.

23. The UE of claim 14, wherein the at least one subband comprises three subbands comprising the SB-FD resource.

24. The UE of claim 23, wherein the configuration message further comprises a selection of the one of the three subbands, a subband size associated with the selected one of the three subbands, and a resource indicator indicating one or more uplink transmission resource set in the SB-FD resource.

25. The UE of claim 23,
wherein the configuration message further comprises:
a selection indicator indicating a selection of a first subband and a second subband of the three or more subbands for the uplink transmission;
if the SB-FD resource is in a first subband of the two selected subbands, a first starting RB index for the first subband and a subband size of the first subband to indicate a starting resource position of the SB-FD resource, or
if the SB-FD resource is in a second subband of the two selected subbands, a second starting RB index for the second subband and a subband size of the second subband to indicate the starting resource position of the SB-FD resource;
wherein the one or more processors are further configured to:
retrieve an offset value;
calculate the starting resource position of the SB-FD resource based on:
the first starting RB index for the first subband, a subband size of the first subband, and the offset value if the SB-FD resource is in the first subband of the two selected subbands, or
the second starting RB index for the second subband, the subband size of the second subband, and the offset value if the SB-FD resource is in the second subband of the two selected subbands; and
wherein transmitting the uplink data further comprises transmitting the uplink data at the starting resource position of the SB-FD resource.

26. The UE of claim 14, wherein the uplink transmission is a physical uplink control channel (PUCCH) transmission or a physical uplink shared channel (PUSCH) transmission.

27. A non-transitory computer readable medium having instructions stored therein that, when executed by one or more processors of a user equipment (UE), cause the one or more processors to:
receive a configuration message associated with at least one subband comprising subband full-duplex (SB-FD) resource in a slot for an uplink transmission associated with the UE, wherein the SB-FD resource overlaps at least partially with a downlink transmission in a time domain within the slot; and
transmit uplink data via the SB-FD resource.

28. The non-transitory computer readable medium of claim 27, wherein the at least one subband comprises two subbands comprising the SB-FD resource.

29. A user equipment (UE), comprising:
means for receiving a configuration message associated with at least one subband comprising subband full-duplex (SB-FD) resource in a slot for an uplink transmission associated with the UE, wherein the SB-FD resource overlaps at least partially with a downlink transmission in a time domain within the slot; and
means for transmitting uplink data via the SB-FD resource.

30. The UE of claim 29, wherein the at least one subband comprises two subbands comprising the SB-FD resource.

* * * * *